United States Patent
Walser et al.

(10) Patent No.: US 11,046,881 B2
(45) Date of Patent: Jun. 29, 2021

(54) MAPPING PROPPED FRACTURES IN A WELL USING ENCAPSULATED SALT

(71) Applicant: HALLIBURTON ENERGY SERVICES, INC., Houston, TX (US)

(72) Inventors: Doug W. Walser, Houston, TX (US); Ronald Glen Dusterhoft, Katy, TX (US); Philip D. Nguyen, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 63 days.

(21) Appl. No.: 16/474,234

(22) PCT Filed: Feb. 9, 2017

(86) PCT No.: PCT/US2017/017113
§ 371 (c)(1),
(2) Date: Jun. 27, 2019

(87) PCT Pub. No.: WO2018/147851
PCT Pub. Date: Aug. 16, 2018

(65) Prior Publication Data
US 2019/0352560 A1    Nov. 21, 2019

(51) Int. Cl.
*E21B 43/267* (2006.01)
*C09K 8/80* (2006.01)
(Continued)

(52) U.S. Cl.
CPC .............. *C09K 8/805* (2013.01); *C09K 8/706* (2013.01); *E21B 43/267* (2013.01); *E21B 49/00* (2013.01); *G01V 3/26* (2013.01)

(58) Field of Classification Search
CPC .......... C09K 8/805; C09K 8/706; C09K 8/80; E21B 43/267; E21B 49/00; G01V 3/26
See application file for complete search history.

(56) References Cited

U.S. PATENT DOCUMENTS 3,674,709 A    7/1972  Barrer et al.
4,547,429 A   10/1985  Greiner et al.
(Continued)

FOREIGN PATENT DOCUMENTS

WO   2010140033 A2   12/2010
WO   2014004815 A1    1/2014
(Continued)

OTHER PUBLICATIONS

Hickey, et al., "Monitoring and Imaging the Dynamics and Extent of Hydraulic Fracturing Fluid Movement Using Ground-Based Electromagnetics, with Application to the Eagle Ford Shale", Unconventional Resources Technology Conference, Jul. 20-25, 2015, 14 pages.

(Continued)

*Primary Examiner* — Steven A MacDonald
(74) *Attorney, Agent, or Firm* — Kilpatrick Townsend & Stockton LLP

(57) ABSTRACT

Mapping propped fractures in a well can be performed using a mixture including a proppant and an encapsulated salt. The proppant can be positioned in a fracture in the well for propping open the fracture to form a propped fracture. The encapsulated salt can be positioned in the propped fracture proximate to the proppant and include a salt and a non-permeable coating. The salt can be dissolved in response to fracture closure, encapsulant degradation, or encapsulant dissolution to form an electrically conductive solution usable for mapping the propped fracture. The non-permeable coating can prevent a fluid from contacting the salt during pumping and placement operations.

7 Claims, 6 Drawing Sheets

(51) Int. Cl.
*C09K 8/70* (2006.01)
*E21B 49/00* (2006.01)
*G01V 3/26* (2006.01)

(56) References Cited

U.S. PATENT DOCUMENTS

| | | | |
|---|---|---|---|
| 6,554,071 B1 | 4/2003 | Reddy et al. | |
| 7,073,581 B2 | 7/2006 | Nguyen et al. | |
| 7,686,084 B2 | 3/2010 | Reddy et al. | |
| 9,250,351 B2 | 2/2016 | Aldridge et al. | |
| 9,434,875 B1* | 9/2016 | Cannan | C23C 18/36 |
| 2002/0193257 A1* | 12/2002 | Lee | C09K 8/706 |
| | | | 507/200 |
| 2005/0178546 A1* | 8/2005 | Reddy | C09K 8/706 |
| | | | 166/278 |
| 2008/0121395 A1 | 5/2008 | Reddy et al. | |
| 2012/0169343 A1 | 7/2012 | Eick et al. | |
| 2014/0251623 A1* | 9/2014 | Lestz | E21B 43/267 |
| | | | 166/308.2 |
| 2014/0374091 A1* | 12/2014 | Wilt | E21B 49/00 |
| | | | 166/254.1 |
| 2015/0083404 A1* | 3/2015 | Wilt | E21B 47/092 |
| | | | 166/250.1 |
| 2015/0192688 A1 | 7/2015 | Pugh et al. | |
| 2015/0252250 A1* | 9/2015 | Levey | C09K 8/887 |
| | | | 166/308.5 |
| 2015/0253453 A1* | 9/2015 | Aldridge | G01V 99/00 |
| | | | 702/11 |
| 2015/0253459 A1 | 9/2015 | Aldridge et al. | |
| 2016/0009977 A1* | 1/2016 | Lu | C09K 8/03 |
| | | | 166/300 |
| 2016/0237342 A1* | 8/2016 | Cannan | C23C 18/1851 |
| 2016/0369163 A1* | 12/2016 | Cannan | B05D 5/12 |
| 2018/0058186 A1* | 3/2018 | Joshi | E21B 43/267 |
| 2020/0209421 A1* | 7/2020 | Mukherjee | E21B 47/092 |

FOREIGN PATENT DOCUMENTS

| | | |
|---|---|---|
| WO | 2014107608 A1 | 7/2014 |
| WO | 2015126365 A1 | 8/2015 |
| WO | 2016201427 A1 | 12/2016 |

OTHER PUBLICATIONS

Palisch, et al., "Far-Field Proppant Detection Using Electromagnetic Methods—Latest Field Results", Society of Petroleum Engineers, SPE Hydraulic Fracturing Technology Conference and Exhibition, Jan. 24-26, 2017, 16 pages.

PCT/US2017/017113, "PCT Search Report", dated Nov. 7, 2017, 5 pages.

* cited by examiner

MAPPING PROPPED FRACTURES IN A WELL USING ENCAPSULATED SALT

TECHNICAL FIELD

The present disclosure relates generally to mapping hydraulic fractures in a well, and more particularly (although not necessarily exclusively), to mapping propped fractures in a well using encapsulated salt.

BACKGROUND

Hydraulic fracturing can be performed in a well system, such as an oil or gas well, for extracting hydrocarbon fluids from a subterranean formation to increase the flow of the hydrocarbon fluids from the subterranean formation. Hydraulic fracturing can include pumping a treatment fluid that includes a proppant mixture into a wellbore formed through the subterranean formation. The treatment fluid can create fractures in the subterranean formation and the proppant mixture can occupy a portion of the fractures to prop the fractures open. Propping the fractures open can allow the hydrocarbon fluids to flow from the subterranean formation through the fractures and into the wellbore. Detecting and mapping the locations of hydraulically induced fractures can be performed by a number of existing technologies, but determining the locations of propped induced fractures can be difficult.

DETAILED DESCRIPTION

Figure 1:
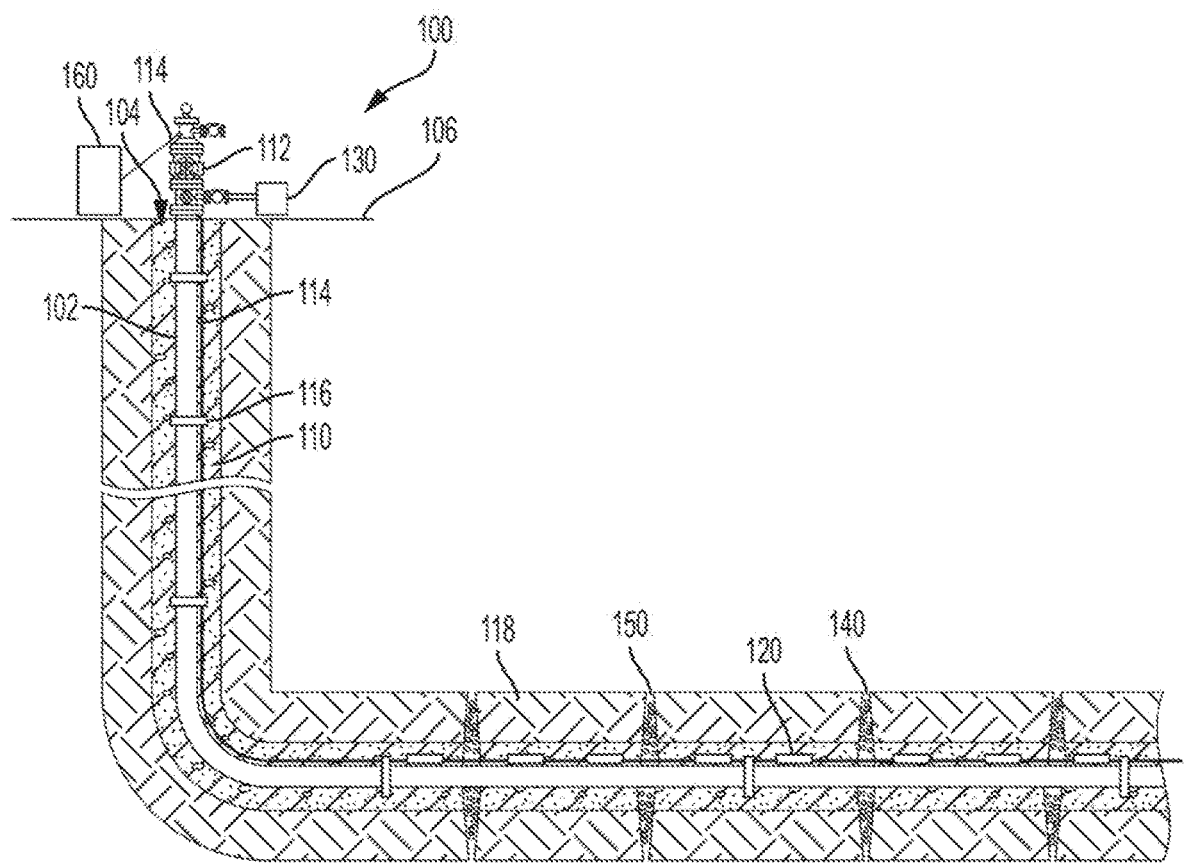
FIG. 1 is a diagram of an example of a well system including a processing device for mapping propped fractures in a well using encapsulated salt according to one aspect of the present disclosure.

Certain aspects and features relate to mapping propped fractures emanating from a well using encapsulated salt. The encapsulated salt can include a salt (e.g., sodium chloride, potassium chloride, calcium chloride, magnesium chloride, or a combination thereof) with a coating for preventing or effectively delaying the salt from contacting fracturing fluid or other dissolving liquids during well stimulation operations. The encapsulated salt can be pumped into a wellbore and surrounding subterranean formation with the proppant during a hydraulic fracturing process as part of a treatment fluid. The treatment fluid can exit the wellbore and create fractures in a subterranean formation. The treatment fluid can include proppant that is positioned within a portion of the fractures to prop the fractures open. The encapsulated salt can be positioned within the fractures in the same approximate locations as the proppant. After placement into the fractures, the coating around the encapsulated salt can rupture or degrade to allow the salt to be exposed to a fluid in the fractures. The salt can dissolve in the fluid to create a more electrically conductive solution that is positioned in (or substantially proximate to) the fractures and intermixed with the proppant. Sensors can be used to detect the electrically conductive solution within a certain rock volume based on electrical signals transmitted through the electrically conductive solution. A processing device can map the fractures based on data from multiple sensors positioned in or around the well.

Using encapsulated salt to form an electrically conductive solution in the propped fractures (e.g. fractures laden with proppant) can provide a low-resistivity porous rock volume immediately adjacent to or near proppant positioned in the fractures after a hydraulic fracturing process has been performed. The electrically conductive solution can be detected in three-dimensional space and a processing device in conjunction with appropriate algorithms can be employed to generate a three-dimensional map of the propped fractures emanating from the well. The mapping operation can include electrically energizing the earth at or near the fractures and measuring the electric, magnetic, or electromagnetic field responses at or near the surface of the earth or in adjacent wellbores. Sensors can measure a response of electric and magnetic fields before the fracturing fluid, proppant, and encapsulated salt have been pumped and measure another response after the electrically conductive solution has been released in the close proximity of the proppant. A processing device in conjunction with appropriate algorithms can compare the responses measured by the sensors to determine the position of the electrically conductive solution and infer the location of the proppant. Mapping the propped fractures and understanding their dimensions and positions in three-dimensional space can be used for evaluating the hydraulic fracturing process, optimizing future well and fracture spacing, and for improving the quality of the hydrocarbon extraction process.

Mapping propped fractures using encapsulated salt in conjunction with non-encapsulated proppant can be more cost-effective than using proppant coated with an electrically conductive material, or using proppant comprised entirely of conductive material. In some aspects, low-grade salt that includes impurities can be encapsulated and used for mapping the location of proppant within induced fractures. For example, encapsulated NaCl can be used with impurities such as $NaSO_4$, $CaCl_2$, KCl, $Fe_3O_4$, FeO, $MgSO_4$, MgCl, and $MgCl_2$ without substantially impacting the accuracy or precision of the fracture mapping. Salt that is released upon rupture or degradation of the encapsulant can produce an electrically conductive solution intermixed with (or proximate to) the proppant such that the electrically conductive solution produces a similar electromagnetic field response to that of using a conductive proppant.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 illustrates an example of a well system 100 that can map fractures formed in a subterranean formation 118 using encapsulated salt. The well system 100 includes a casing string 102 positioned in a wellbore 104 that has been formed in a surface 106 of the earth and through the subterranean formation 118. The well system 100 may have been constructed and completed in any suitable manner, such as by use of a drilling assembly having a drill bit for creating the wellbore 104. The casing string 102 may include tubular casing sections connected by end-to-end couplings. In some aspects, the casing string 102 may be made of a suitable material such as steel. Within the wellbore 104, cement 110 may be injected and allowed to set between an outer surface of the casing string 102 and an inner surface of the wellbore 104.

At the surface 106 of the wellbore 104, a tree assembly 112 may be joined to the casing string 102. The tree assembly 112 may include an assembly of valves, spools, fittings, etc. to direct and control the flow of fluid (e.g., oil, gas, water, etc.) into or out of the wellbore 104 within the casing string 102. For example, a pump 130 (e.g., well stimulation pumping equipment) can be coupled to the tree assembly 112 for injecting a treatment fluid into the wellbore 104 as part of a hydraulic fracturing process. The treatment fluid can form fractures 140 through holes, sleeves, or ports in the casing string 102, through the cement 110 or open annulus, and into the surrounding subterranean formation 118. The treatment fluid can include a mixture 150 of proppants and encapsulated salt. In some examples, auxiliary equipment located near the pump 130 encapsulates granular salt and mixes it 150 on-the-fly such that it can be immediately pumped into the wellbore 104. The salt can be protected from dissolution in the fracturing fluid by coating the salt with a non-permeable material. The proppant can be positioned in the fractures 140 to prop the fractures 140 open such that production fluid can flow from the surrounding subterranean formation 118 into the wellbore 104. As part of the mixture 150, the encapsulated salt can be positioned proximate to proppant in the fractures 140. The non-permeable coating can rupture, dissolve, or degrade after the hydraulic fracturing process is complete and allow the salt to dissolve in the fracturing fluid proximate to the formation water or in the formation fluid itself. By increasing the chloride content of the proximate fracturing fluid and/or formation water, a more electrically conductive solution is formed than would have been present without the salt. In some aspects of the process, the well could be shut in for an extended period of time after the stimulation has been completed, in order that fracturing fluids located inside a propped fracture have a chance to leak off into the surrounding matrix. Such a period of time could promote the rapid rupture or degradation of the encapsulant, thereby exposing salt to fracturing fluid, and further changing the electrical conductivity of the fluid inside of and proximate to the propped fracture.

A cable 114 may be routed through one or more ports in the tree assembly 112 and extend along an outer surface of the casing string 102. The cable 114 can communicatively couple sensors 120 to a processing device 160. The sensors 120 may be deployed in the wellbore 104 and used to measure data that can be used by the processing device 160 to determine features (e.g., size, shape, or location) of the fractures 140.

In some examples, the subterranean formation 118 proximate to the fractures 140 can be electrically energized and the sensors 120 can measure responses in an electromagnetic field transmitted in the well or from a nearby well. The responses can be based on the amount and location of the electrically conductive solution in the fractures 140 such that the processing device 160 can perform a low-frequency inversion of the measured data to determine a location of the electrically conductive solution and map the fractures 140. In additional or alternative aspects, the processing device 160 can determine a base-case low frequency resistivity profile in a reservoir volume adjacent to one or more of the expected locations of fractures 140 prior to stimulation and completion activities. In some aspects, the processing device 160 can determine a location of more conductive pathways near the propped fractures 140 after stimulation activities and after the encapsulant has ruptured, degraded, or dissolved.

The cable 114 may be retained against the outer surface of the casing string 102 at intervals by coupling bands 116 that extend around the casing string 102. In some aspects, the cable 114 can be positioned exterior to the casing string 102, but other deployment options may also be implemented. For example, the cable 114 can be coupled to a wireline or coiled tubing. The wireline or coiled tubing can be positioned in an inner area of the casing string 102. The cable 114 can be coupled to the wireline or the coiled tubing such that the cable 114 is removable from the inner area of the casing string 102 with the wireline or the coiled tubing.

Figure 2:
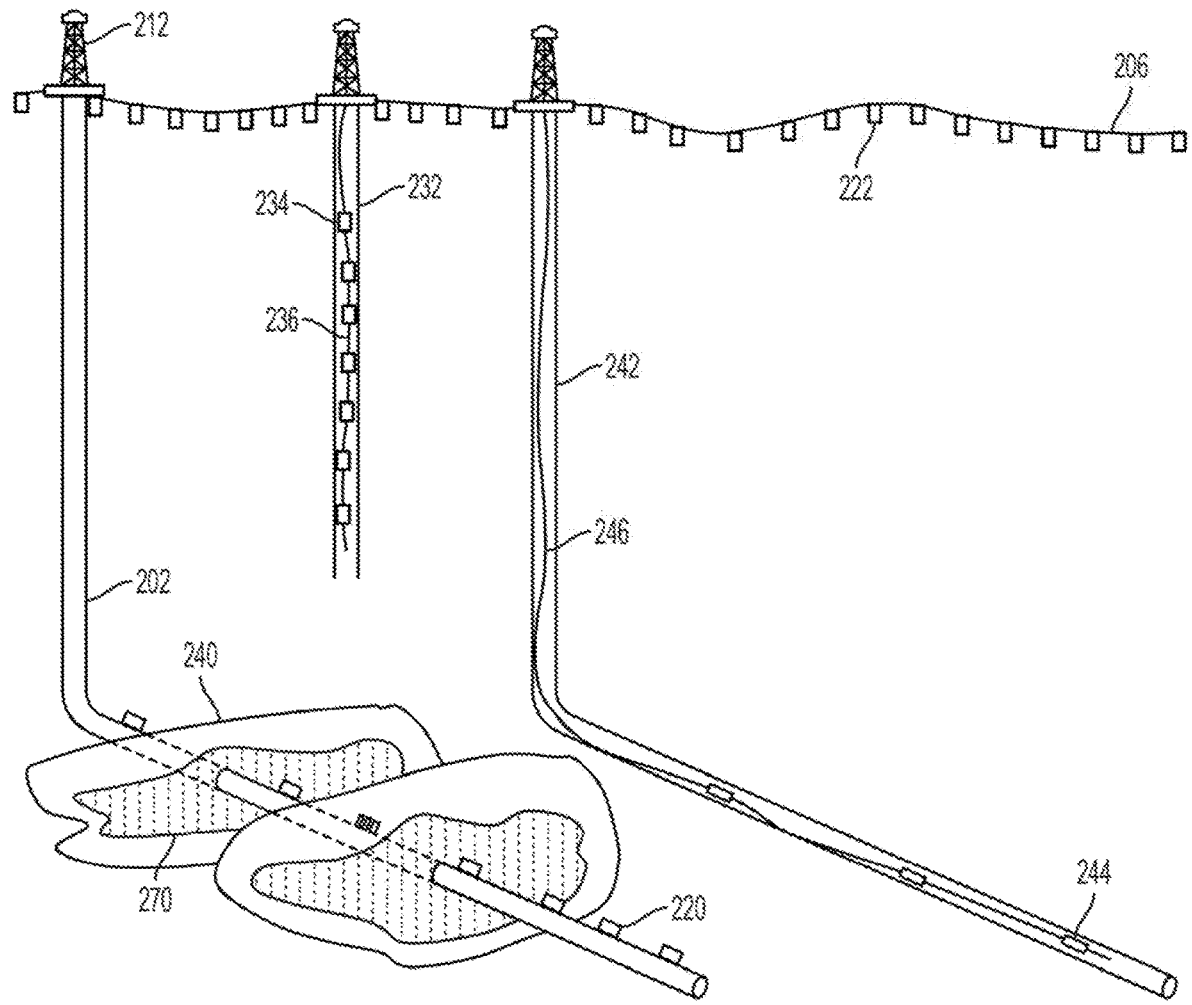
FIG. 2 is a diagram depicting another example of a well system for mapping propped fractures in a well using encapsulated salt according to one aspect of the present disclosure.

Although FIG. 1 depicts the sensors 120 as being positioned at a uniform depth, sensors can be positioned at different depths and locations. For example, FIG. 2 depicts a well system 200 with some sensors 222 positioned at or proximate the surface 206 to facilitate or improve the quality of the inversion and the precision of the mapping. In additional or alternative examples, sensors 222 can be positioned at the surface 206 in an array with a diameter of approximately 85% of the true vertical depth of the fractures and the wellbore 202 at the center of the array from an X-Y perspective. Additional sensors can be positioned at or above the depth of the fractures 240 in one or more additional vertical or horizontal wellbores 232, 242 proximate to the wellbore 202. The responses measured by the variety of sensors 220, 222, 234 can be used by a processing device and appropriate algorithms to facilitate or improve the quality and/or resolution of the fracture mapping.

The well system 200 also includes a series of electromagnetic wave generators 244 placed inside an uncompleted wellbore casing 242 proximate to the expected stimulated reservoir volume. Sensors 220, 222, 234 at or near the surface 206, in an offset wellbore 232, in the treatment well 202, or combinations thereof may be employed to characterize the resistivity profile of the reservoir volume near the well 202 before, during, and after stimulation.

Electrical power for the series of electromagnetic wave generators 244 may be supplied from the surface 206. The electrical power can be transmitted down the uncompleted wellbore 242 via conductive wireline 246 to the generators 244. Electrical power for the series of electromagnetic wave sensors in the offset wellbore 232 may be supplied from the surface 206 and transmitted down the offset well via conductive wireline 236.

FIG. 2 also depicts an electrically conductive solution 270 positioned in the fractures 240 of the well system 200.

Treatment fluid may have been pumped through a casing string during a hydraulic fracturing process, and the treatment fluid may have formed the fractures 240 in the subterranean formation. A mixture (e.g., the mixture 150 in FIG. 1) can include encapsulated salt that includes a coating that deteriorates, or ruptures, or dissolves to expose the salt. For example, the encapsulated salt can include a coating that ruptures during fracture closure to expose the salt. In additional or alternative examples, the coating can include a paraffinic material that melts at geothermal temperatures present downhole. The electrically conductive solution 270 can form by the salt being dissolved by a fluid such that the electrically conductive solution 270 is positioned in or adjacent to the propped fractures 240.

Figure 3:
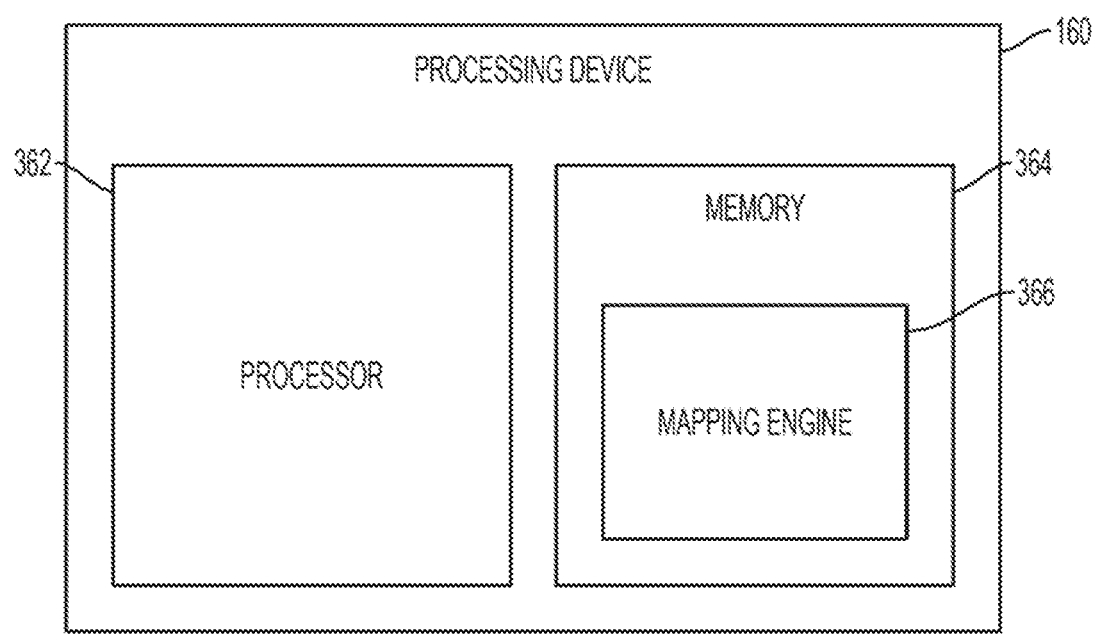
FIG. 3 is a block diagram of a processing device for mapping propped fractures in a well using encapsulated salt according to one aspect of the present disclosure.

FIG. 3 depicts an example of the processing device 160 in FIG. 1. The processing device 160 can include any number of processors 362 configured for executing program code stored in memory 364. Examples of the processing device 160 can include a microprocessor, an application-specific integrated circuit ("ASIC"), a field-programmable gate array ("FPGA"), or other suitable processor. In some aspects, the processing device 160 can be a dedicated processing device used for mapping fractures in a well using encapsulated salt. In additional or alternative aspects, the processing device 160 can perform functions in addition to mapping the fractures 140.

The processing device 160 can include (or be communicatively coupled with) a non-transitory computer-readable memory 364. The memory 364 can include one or more memory device that can store program instructions. The program instructions can include, for example, a mapping engine 366 that is executable by the processing device 160 to obtain fiscally useful information, such as the location of propped fractures within or near a given reservoir.

The operations can include causing a pumping subsystem to form an electrically conductive solution in a fracture using encapsulated salt. In some examples, the processing device 160 can determine the encapsulant has ruptured based on the amount of time that has passed since a pump stopped pumping the mixture into the wellbore. In additional or alternative examples, the processing device 160 can use extrinsic information from other fracture mapping technologies, processes, or algorithms that can assist in determining fracture closure, encapsulant rupture, or encapsulant degradation. The operations can further include determining a location of the electrically conductive solution based on sensor data. The processing device 160 can receive sensor data from sensors indicating information about an electromagnetic field formed in the reservoir volume proximate to the wellbore 104.

The operations can further include determining the geometry and positioning of a propped fracture 140 or group of fractures in the stimulated reservoir volume based on the position of the electrically conductive solution. The encapsulated salt can include an encapsulant that allows minimal leakage of the salt during the hydraulic fracturing process.

Figure 4:
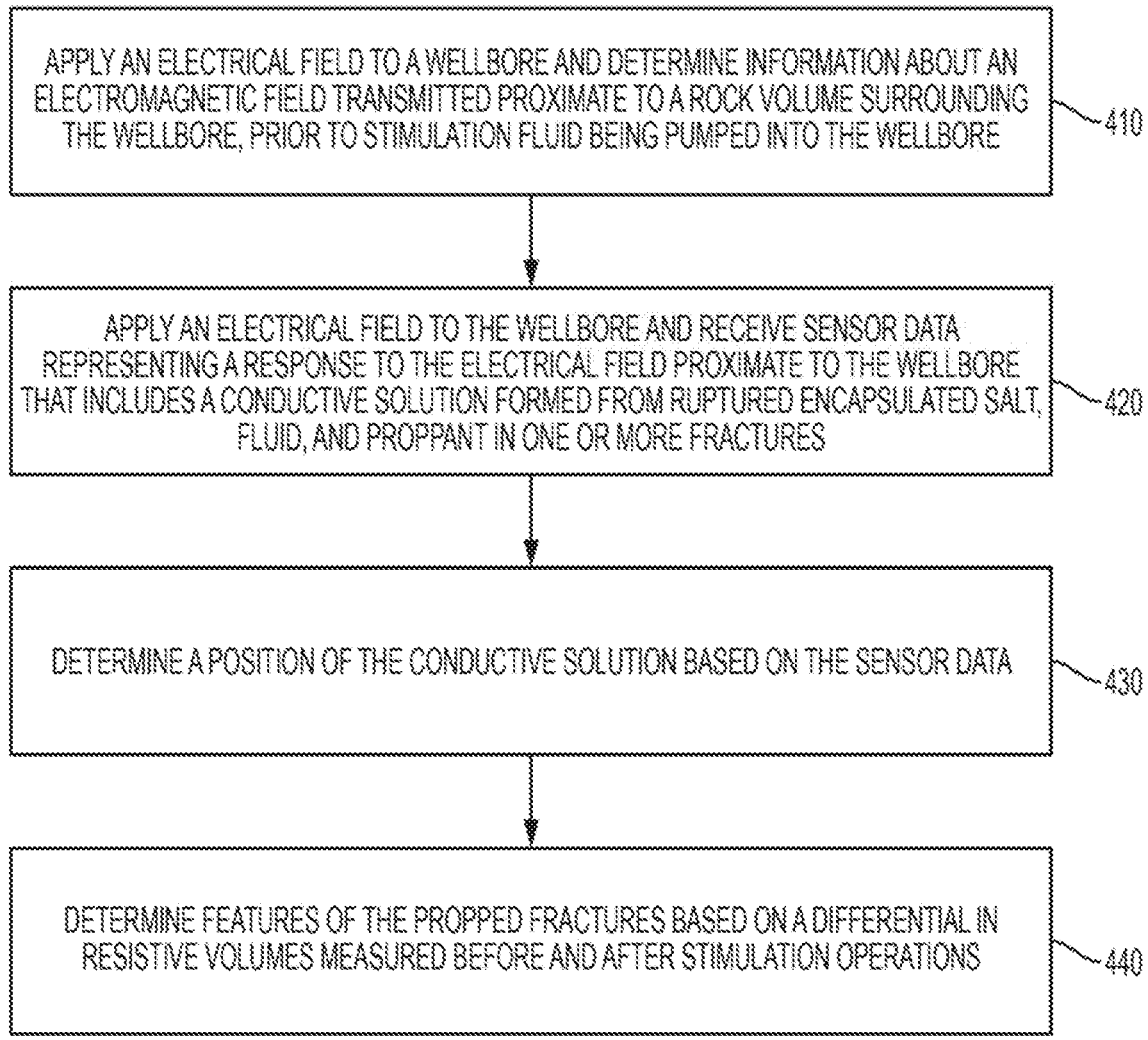
FIG. 4 is a flow chart of a process for mapping the propped portions of fractures emanating from a well using encapsulated salt, according to one aspect of the present disclosure.

FIG. 4 depicts a process for mapping propped fractures in a well using encapsulated salt. The process, as described below, can be implemented by the well system in FIG. 1, or FIG. 2, but other implementations are possible.

In block 410, the processing device 160 information is determined about an electromagnetic field transmitted through a reservoir volume or subterranean formation that has not yet been stimulated. The processing device 160 can process the information to determine a baseline resistive character of the rock volume before the stimulation process is initiated.

In block 420, the processing device 160 determines information about an electromagnetic field transmitted through a stimulated reservoir volume or subterranean formation that includes an electrically conductive solution formed from ruptured encapsulated salt, fluid, and proppant in one or more fractures. In some examples, the ruptured encapsulated salt can include salt with encapsulation degradation or encapsulation dissolution. The fractures can be formed by pumping a mixture of the encapsulated salt and proppant through the wellbore as part of a treatment fluid during a hydraulic fracturing operation. The processed information can include magnitude and positioning of variations in the resistivity of the subterranean formation through which the electromagnetic field passes. In some examples, a system can include one or more electromagnetic field generators for transmitting the electromagnetic field through the subterranean formation to the electromagnetic detectors.

In block 430, the processing device 160 and appropriate algorithms determines a position of the electrically conductive solution based on the sensor data. In some examples, the sensors can be positioned in the wellbore, at the surface in an array, or in nearby wellbores and measure changes in the magnitude or position of the electromagnetic field over time.

In block 440, the processing device 160 and appropriate algorithms can assist in determining a position of one or more propped fractures in three-dimensional space. Determining a position of one or more fractures can in be used to for optimizing fracture spacing (or positioning) and well spacing (or positioning), which can lower the cost of hydrocarbon extraction and responsibly ensure that reserves are efficiently recovered.

Figure 5:
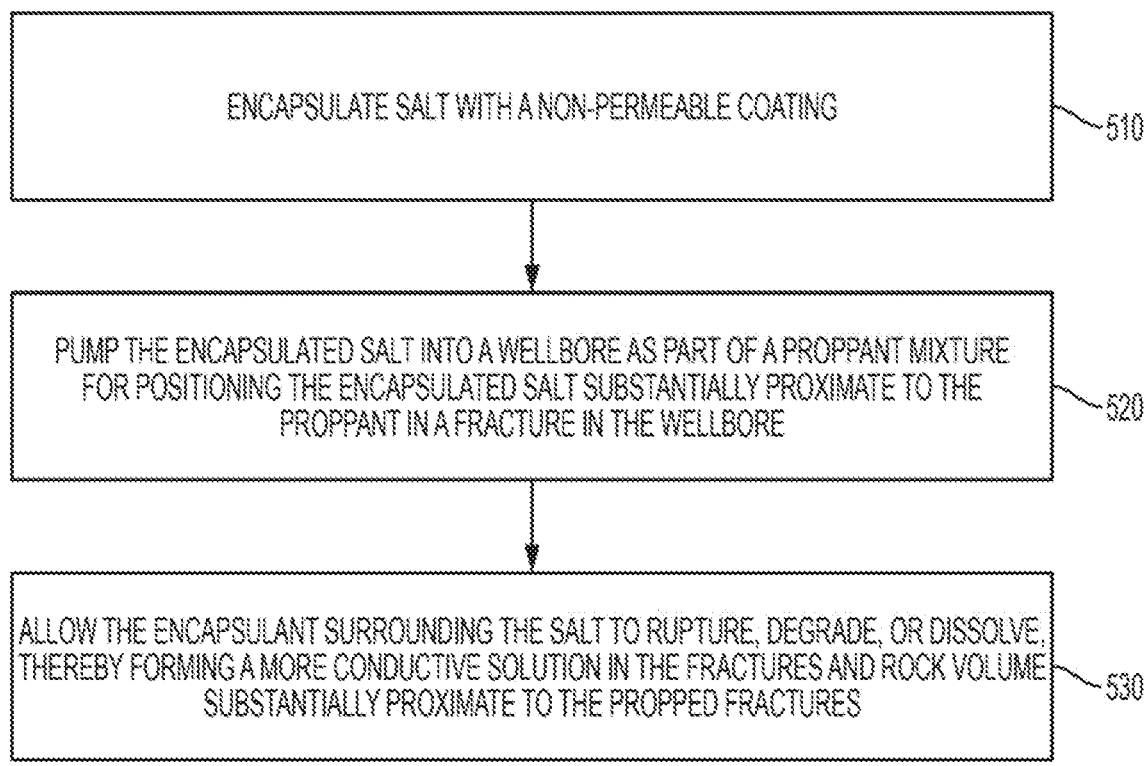
FIG. 5 is a flow chart of a process for forming an electrically conductive solution in propped fractures emanating from a well using encapsulated salt according to one aspect of the present disclosure.

FIG. 5 depicts a process for forming an electrically conductive solution in a fracture. The process can be implemented by a pumping system in a well system as part of a hydraulic fracturing process. In some examples, the process can form the electrically conductive solution in the fracture and intermix with the proppant such that the location of the proppant can be mapped using electromagnetic sensors.

In block 510, salt is encapsulated with an encapsulant or a non-permeable coating. In some aspects, the salt may be encapsulated off-site and shipped to a well site. In additional or alternative aspects, the salt may be encapsulated "on-the-fly" as it is pumped downhole or produced at the well site (or proximate to a wellbore). In some examples, the encapsulated salt is formed by a pumping system in response to instructions from a processing device. In additional or alternative examples, the encapsulated salt can be formed independently of the pumping system and provided to the pumping system.

A salt particle can be surrounded by an encapsulant to form an encapsulated salt suitable for placement along with proppant, or a propping agent, in an induced fracture in a subterranean formation. The encapsulant can be non-permeable such that the encapsulant prevents a fluid from contacting and dissolving the salt particles. The encapsulant can be an oleophilic material for preventing or effectively delaying the encapsulated salt from dissolving in water. In some examples, the encapsulant can include polycarbonate, polylactic acid, polyester, co-polymers of styrene or methyl methacrylate, t-butyl amino ethyl methacrylate, homopolymer or copolymer of ethylene, propylene, isobutylene, vinyl chloride, or vinylidene chloride, copolymers of styrene and butadiene, copolymers of vinylidene chloride, homo or copolymers of epoxide, polycarbonate, ethylene oxide, propylene oxide, paraffinic materials, or combinations thereof.

The encapsulant can be applied to the salt particle using polymer coating, spray drying, or melt coating. For example, a solid encapsulant can be melted to a non-solid state and combined with salt particles such that the salt particles are coated with the encapsulant. As the encapsulant cools, the encapsulant can solidify around the salt particles and form solid encapsulated salt. The process can be repeated or the size of the salt particles can be varied to produce encapsulated salt of a predetermined size such that the encapsulated salt can later be pumped in a manner that it can be placed in approximately the same location as the proppant in a subterranean location.

In additional or alternative examples, a continuous non-permeable coating of an encapsulant is formed by polymerization, for example, an epoxy-based resin and an amine-curing agent. In this process, the salt particles to be encapsulated can be centrifugally projected through a thin film of the encapsulating material. The encapsulant formed by passage of the salt particles through a film of the encapsulating material can then hardened by contact with a substance reactive with the encapsulating material to form a non-permeable, hardened coating around the salt.

In block 520, the encapsulated salt is pumped into a wellbore as part of a proppant mixture, or treatment fluid, for positioning the encapsulated salt substantially proximate to the proppant in a fracture in the wellbore. The encapsulated salt can have approximately the same mesh size as the proppant such that the encapsulated salt can be positioned intermixed with the proppant in the fracture. The proppant mixture can be formed by a pumping system during the hydraulic fracturing process at substantially the same time that the proppant mixture is pumped into the wellbore, or it may be pre-prepared off-site in a separate encapsulating operation.

Figure 6:
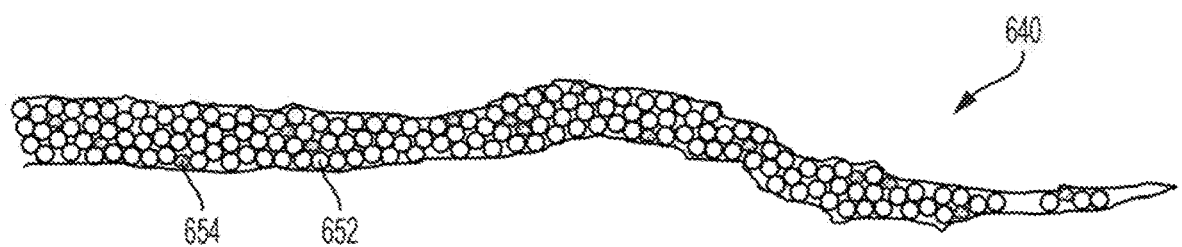
FIG. 6 is a diagram of an example of a fracture with a mixture of proppant and encapsulated salt positioned therein according to one aspect of the present disclosure.

FIG. 6 depicts a cross-section of fracture 640 with proppant 652 and encapsulated salt 654. After stimulation operations, the fracture 640 can begin to close in response to fluid leak-off into the subterranean rock volume surrounding the wellbore. As the fracture 640 closes or time passes, the walls of the fracture 640 can apply a force to the proppant and encapsulated salt mixture positioned in fracture 640.

In this example, the force of the closing fracture 640, or time passing can rupture the encapsulant around the encapsulated salt 654. In additional or alternative examples, the encapsulant can dissolve or degrade due to conditions downhole in the wellbore. For example, the encapsulated salt 654 can include a wax coating that melts at the geothermal temperatures present in the fracture 640.

In block 530 of FIG. 5, the encapsulant surrounding the salt is allowed to rupture, degrade, or dissolve, thereby forming a more electrically conductive solution in the fractures and rock volume substantially proximate to the propped fractures. In some examples, a more electrically conductive solution in the fractures and rock volume can form immediately proximate to the propped fractures. The amount of encapsulated salt (by weight or volume) included in a fracturing fluid and proppant mixture can be variable, and can be determined by the in-situ chloride content of the fluid present in the formation before the stimulation operation and the chloride content of the fluid pumped into the fracture. The quantity of encapsulated salt added per gallon of fluid can be determined on-the-fly during a hydraulic pumping process or predetermined. In some examples, the treatment fluid can have a salinity (or an amount of Cl$^-$) of approximately 1,000 milligrams per liter. In a well with formation fluid having a low salinity (e.g., 10,000 mg/l), using a treatment fluid with approximately one and a half pounds of encapsulated salt per gallon of treatment fluid can cause a positive resistivity differential upon salt dissolving after the encapsulant ruptures, dissolves, or degrades. In a well with formation fluid having a moderate salinity (e.g., 35,000 mg/l), a low resistivity differential may be caused by an encapsulated salt concentration of approximately three and a half pounds per gallon. In a well with a formation fluid including a saturated brine (e.g., 180,000 mg/l), an encapsulated salt concentration of approximately half a pound per gallon can yield a mid-range resistivity differential upon salt dissolving after the encapsulant ruptures, dissolves, or degrades that is distinguishable between the treatment fluid and the formation water.

Figure 7:
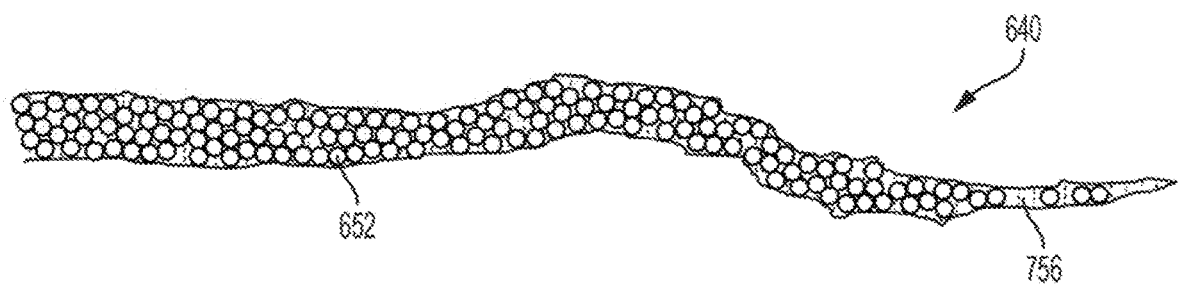
FIG. 7 is a diagram of an example of a fracture with proppant and a more electrically conductive solution positioned therein subsequent to the encapsulant rupturing, dissolving, or degrading according to one aspect of the present disclosure.

FIG. 7 depicts a cross-section the fracture 640 in FIG. 6 after the encapsulated salt 654 has dissolved to form an electrically conductive solution 756. In some examples, the conductive solution 756 can fill the fracture 640. In additional or alternative examples, the electrically conductive solution 756 can leak off into the permeable reservoir, but remain proximate to the portions of the fracture 640 that had included the encapsulated salt 654. An electrical current can be applied to the formation in the treatment wellbore or in an offset wellbore, and the position of the electrically conductive solution 756 can be determined based on a response of an electromagnetic field.

In some aspects, mapping fractures in a well using encapsulated salt is provided according to one or more of the following examples:

Example #1

A mixture can include a proppant and an encapsulated salt. The proppant can be positioned in a fracture in a well for propping open the fracture to form a propped fracture. The encapsulated salt can be positioned in the fracture proximate to the proppant. The encapsulated salt can include a salt and a non-permeable coating. The salt can be dissolved in response to fracture closure, encapsulant degradation, or encapsulant dissolution to form an electrically conductive solution that can be used for mapping the propped fracture. The non-permeable coating can be prevent or effectively delay a fluid from contacting the salt during pumping and placement operations.

Example #2

The mixture of Example #1, can feature the non-permeable coating including a material for rupturing in response to the propped fracture closing such that the salt can be exposed to the fluid.

Example #3

The mixture of Example #1, can feature the non-permeable coating including a material for degrading, dissolving, or melting in response to environmental conditions in the propped fracture such that the salt can be exposed to the fluid.

Example #4

The mixture of Example #1, can feature the non-permeable coating including an oleophilic material.

Example #5

The mixture of Example #1, can feature the non-permeable coating including a paraffinic material.

Example #6

The mixture of Example #1, can feature the non-permeable coating including a polylactic acid.

Example #7

The mixture of Example #1, can feature the non-permeable coating being at least one of a polycarbonate, polylactic acid, polyester, co-polymers of styrene or methyl methacrylate, t-butyl amino ethyl methacrylate, homopolymer or copolymer of ethylene, propylene, isobutylene, vinyl chloride, or vinylidene chloride, copolymers of styrene and butadiene, copolymers of vinylidene chloride, homo or copolymers of epoxide, polycarbonate, ethylene oxide, or propylene oxide.

Example #8

The mixture of Example #1, can feature the mixture forming part of a treatment fluid that can be injected into the well and surrounding subterranean formation to form one or more propped fractures during a hydraulic fracturing process.

Example #9

The mixture of Example #1, can feature the proppant occupying a greater volume than the encapsulated salt.

Example #10

The mixture of Example #1, can feature the fluid including fracturing fluid, formation fluid, or a mixture thereof. The salt can be dissolved in response to contacting the fluid to form the electrically conductive solution intermixed with the proppant such that a position of the electrically conductive solution can be detected by electromagnetic sensors for determining a position of the proppant in the well. The position of the proppant in the well can be used for mapping the propped fractures by referring to the size, shape, or location of the proppant in the propped fracture.

Example #11

A system can include a processing device and a memory device on which instructions are stored. The instructions can be executed by the processing device to cause the processing device to receive sensor data representing a response of an electromagnetic field to an electrical current. The electric current can be applied to a subterranean formation that includes one or more propped fractures in which a mixture is positioned. The mixture can include proppant and an electrically conductive solution formed from encapsulated salt. The instructions can also be executed to determine geometry and position of one or more propped fractures in the subterranean formation based on the sensor data.

Example #12

The system of Example #11, further including one or more sensors communicatively coupled to the processing device for reading the sensor data based on the response of the electromagnetic field to the electrical current. The instructions that cause the geometry and positioning of the one or more propped fractures can include determining a position of the electrically conductive solution based on the sensor data. The instructions can further include mapping the one or more propped fractures by calculating a model of the subterranean formation that indicates a size, shape, or location of the one or more propped fractures based on the position of the electrically conductive solution.

Example #13

A method can include determining information about an electromagnetic field transmitted from a well that includes a wellbore formed through a subterranean formation and one or more hydraulically induced fractures in which fluid, proppant, and an electrically conductive solution formed from encapsulated salt are positioned to form a propped fracture proximate to another wellbore. The method can further include receiving sensor data representing a response of the electromagnetic field to an electrical current applied to the subterranean formation. The method can further include determining a position of the electrically conductive solution in the well based on the sensor data. The method can further include determining geometry and position of one or more propped fractures in the subterranean formation based on the position of the electrically conductive solution.

Example #14

The method of Example #13, can further include causing a pumping system to inject the encapsulated salt into the wellbore with the proppant as part of a treatment fluid for forming the propped fracture.

Example #15

The method of Example #14, can further feature causing the pumping system to inject the encapsulated salt into the wellbore by causing the pumping system to encapsulate the salt on-the fly at a well site with a non-permeable coating to produce the encapsulated salt or causing the pumping system to combine the encapsulated salt with the proppant to be added to the treatment fluid.

Example #16

The method of Example #15, can feature encapsulating the salt further including causing the pumping system to melt an oleophilic material to a non-solid state. Encapsulating the salt can further include causing the pumping system to coat salt particles with melted oleophilic material by passing the salt particles through the melted oleophilic material. Encapsulating the salt can further include causing the pumping system to cool the salt particles such that the melted oleophilic material solidifies.

Example #17

The method of Example #15, can feature the proppant occupying a greater volume than the encapsulated salt. Causing the pumping system to encapsulate the salt on-the fly at a well site with a non-permeable coating can further include encapsulating the salt with at least one of a polycarbonate, polylactic acid, polyester, co-polymers of styrene or methyl methacrylate, t-butyl amino ethyl methacrylate, homopolymer or copolymer of ethylene, propylene, isobutylene, vinyl chloride, or vinylidene chloride, copolymers of styrene and butadiene, copolymers of vinylidene chloride, homo or copolymers of epoxide, polycarbonate, ethylene oxide, or propylene oxide to form the encapsulated salt.

Example #18

The method of Example #14, can feature causing the pumping system to inject the encapsulated salt into wellbore to include obtaining pre-encapsulated salt and transporting it to a well site. Causing the pumping system to inject the encapsulated salt into the wellbore can further include causing the pumping system to combine the pre-encapsulated salt with the proppant to be added to the treatment fluid.

Example #19

The method of Example #14, can feature causing the pumping system to inject the fluid into the wellbore by determining after a period of time that the encapsulated salt has ruptured, degraded, or dissolved such that the salt is exposed.

Example #20

The method of Example #13, can include applying the electrical current to the subterranean formation. Determining the geometry and position of the one or more propped fractures can include determining a position of the proppant based on the position of the electrically conductive solution. Determining the geometry and position of the one or more propped fractures can further include mapping the propped fracture by calculating a model of the subterranean formation that indicates a size, shape, or location of the propped fracture based on the position of the proppant.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device;
a memory device on which instructions are stored that are executable by the processing device to:
receive sensor data representing a response of an electromagnetic field to an electrical current applied to a subterranean formation of a well site that includes one or more propped fractures in which a mixture is positioned, the mixture including proppant and an electrically conductive solution formed from encapsulated salt;
determine a position of the electrically conductive solution in the subterranean formation based on the sensor data;
determine geometry and position of one or more propped fractures in the subterranean formation based on the position of the electrically conductive solution; and
a pumping system configured to encapsulate the salt on-the fly at the well site with an oleophilic material.

2. The system of claim 1, further comprising one or more sensors communicatively coupled to the processing device for reading the sensor data based on the response of the electromagnetic field to the electrical current, wherein the instructions that are executable to determine the geometry and positioning of the one or more propped fractures are executable to:
determine a position of the electrically conductive solution based on the sensor data; and
map the one or more propped fractures by calculating a model of the subterranean formation that indicates a size, shape, or location of the one or more propped fractures based on the position of the electrically conductive solution.

3. A method comprising:
determining information about an electromagnetic field transmitted from a well that includes a wellbore formed through a subterranean formation and one or more hydraulically induced fractures in which fluid, proppant, and an electrically conductive solution formed from encapsulated salt are positioned to form a propped fracture proximate to another wellbore;
receiving sensor data representing a response of the electromagnetic field to an electrical current applied to the subterranean formation;
determining a position of the electrically conductive solution in the well based on the sensor data;
determining geometry and position of one or more propped fractures in the subterranean formation based on the position of the electrically conductive solution;
causing a pumping system to inject the encapsulated salt into the wellbore with the proppant as part of a treatment fluid for forming the propped fracture, further comprising one of:
(a) causing the pumping system to encapsulate the salt on-the fly at a well site with a non-permeable coating to produce the encapsulated salt,
(b) causing the pumping system to combine the encapsulated salt with the proppant to be added to the treatment fluid; and
wherein encapsulating the salt further comprises:
causing the pumping system to melt an oleophilic material to a non-solid state;
causing the pumping system to coat salt particles with melted oleophilic material by passing the salt particles through the melted oleophilic material; and
causing the pumping system to cool the salt particles such that the melted oleopilic material solidifies.

4. The method of claim 3, wherein the proppant occupies a greater volume than the encapsulated salt, and wherein causing the pumping system to encapsulate the salt on-the fly at a well site with a non-permeable coating further comprises encapsulating the salt with at least one of a polycarbonate, polylactic acid, polyester, co-polymers of styrene or methyl methacrylate, t-butyl amino ethyl methacrylate, homopolymer or copolymer of ethylene, propylene, isobutylene, vinyl chloride, or vinylidene chloride, copolymers of styrene and butadiene, copolymers of vinylidene chloride, homo or copolymers of epoxide, polycarbonate, ethylene oxide, or propylene oxide to form the encapsulated salt.

5. The method of claim 3, wherein causing the pumping system to inject the encapsulated salt into wellbore comprises:
obtaining pre-encapsulated salt and transporting it to a well site; and
causing the pumping system to combine the pre-encapsulated salt with the proppant to be added to the treatment fluid.

6. The method of claim 3, wherein causing the pumping system to inject the fluid into the wellbore further comprises determining after a period of time that the encapsulated salt has ruptured, degraded, or dissolved such that the salt is exposed.

7. The method of claim 3, further comprising applying the electrical current to the subterranean formation, wherein determining the geometry and position of the one or more propped fractures comprises:
  determining a position of the proppant based on the position of the electrically conductive solution; and
  mapping the propped fracture by calculating a model of the subterranean formation that indicates a size, shape, or location of the propped fracture based on the position of the proppant.

* * * * *